US006282046B1

(12) United States Patent
Houston et al.

(10) Patent No.: US 6,282,046 B1
(45) Date of Patent: Aug. 28, 2001

(54) CURRENT LIMITING IN HIGH PERFORMANCE FILES

(75) Inventors: George Robert Houston; Louis Joseph Serrano, both of San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/146,993

(22) Filed: Sep. 4, 1998

(51) Int. Cl.$^7$ ................................................ G11B 19/14
(52) U.S. Cl. ............................ 360/73.03; 360/69; 360/75
(58) Field of Search ................................... 360/73.03, 69, 360/71, 75, 78.04, 78.07, 78.14; 318/64, 90, 268, 271; 388/847

(56) References Cited

U.S. PATENT DOCUMENTS

| | | |
|---|---|---|
| 4,516,060 | 5/1985 | Guzik et al. . |
| 5,373,495 | 12/1994 | Takada . |
| 5,381,279 * | 1/1995 | Dunn .............................. 360/73.03 X |
| 5,569,990 | 10/1996 | Dunfield . |
| 5,589,996 | 12/1996 | Patrick et al. ..................... 360/73.03 |

FOREIGN PATENT DOCUMENTS

| | | |
|---|---|---|
| 6-302087 | 10/1994 | (JP) . |
| 10-11870 * | 1/1998 | (JP) . |

\* cited by examiner

*Primary Examiner*—David Hudspeth
*Assistant Examiner*—James L Habermehl
(74) *Attorney, Agent, or Firm*—Robert O. Guillot; Oppenheimer Wolff & Donnelly LLP

(57) ABSTRACT

In a disk drive system a servo controller is responsive to a position signal and operative to determine values for servo parameters during each of a plurality of sampling intervals, and is also operative to update a spindle command signal and an actuator command signal during sampling intervals for controlling seeking operations including an acceleration sequence and a deceleration sequence for positioning a head at a target track. The controller is further operative to implement a process of limiting the current drawn by a supply during periods of the deceleration sequence. The spindle command signal is regulated to adjust a spindle current to a reduced value which is less than a nominal value during a spindle energy deferring period while an actuator current exceeds a predetermined threshold value. During each of the sampling intervals transpiring during the spindle energy deferring period: a deferred spindle current value, which is proportional to the difference between the nominal value and the reduced value, is determined; and the deferred spindle current value is added to an accumulation of prior deferred spindle current values to develop a measure of deferred spindle energy. The spindle command signal is subsequently regulated to adjust the spindle current to an increased value which is greater than the nominal value during a spindle energy compensating period to develop a quantity of compensating spindle energy which is approximately equal to the measure of deferred spindle energy.

29 Claims, 6 Drawing Sheets

CURRENT LIMITING IN HIGH PERFORMANCE FILES

BACKGROUND OF THE INVENTION

1. Field of the Invention

The present invention relates to a disk drive system having means for optimizing power consumption efficiency during a seek operation. More particularly, the present invention relates to a method for reducing spindle driving current while actuator driving current reaches a peak during the deceleration sequence of an actuator seek operation.

2. Description of the Prior Art

Modern disk drive systems typically include: a disk having a thin magnetic coating upon which user data and position information is stored in a series of concentric or spiral tracks; a spindle motor assembly for supporting and rotating the disk in response to a spindle current provided by a spindle driver circuit; a read/write head for generating and detecting variations in magnetic orientation of the magnetic material as the disk is rotated relative to the head; a head-arm assembly for supporting and moving the head radially over the surface of the disk; and an actuator, usually comprising a voice coil motor, for driving the head-arm assembly in response to an actuator current provided by an actuator driver circuit. Disk drive systems also include a channel unit, having a read/write channel and a position error channel, electrically coupled to the read/write head via an arm electronics unit; and a servo controller unit responsive to a position error signal received from the head via the channel unit, and operative to provide an actuator control signal to the actuator driver circuit for controlling the actuator current, and further operative to provide a spindle command signal to the spindle driver circuit for controlling the spindle current.

The position error signal, which is proportional to the relative difference of the positions of the center of the servo head and the nearest track center, provides information relating to sources of motion including motion of the actuator and motion of the disk surface itself. The servo system, whether of a dedicated servo type or an embedded servo type, uses the position error signal to keep track of actuator position as well as velocity.

The servo system may be analog or digital. Digital servo control systems are discrete time systems in which position information is sampled. Modern digital servo controllers, which may be implemented by a microprocessor or a digital signal processor, use state estimators to determine velocity. Analog servo systems use either a velocity transducer or some type of estimating scheme to determine velocity parameters. A typical analog velocity estimator uses both a filtered integral of acceleration and a filtered derivative of position to obtain velocity feed back.

Servo systems may operate in several modes generally including a track following mode and a seek mode. In the track following mode, the servo controller maintains the head in a path over the centerline of a selected track to facilitate accurate reading and recording of data in the track. In the seek mode, the servo controller is directed to place the head on a target track different from the present track. A seek operation includes an acceleration sequence and a deceleration sequence. During each of these sequences, the current provided by the actuator driver circuit to the actuator is increased to a peak value which is greater than the average current value. The seeking performance of a servo system is proportional to the amount of power available for providing current to the actuator during acceleration and deceleration.

Typically, a single power supply provides power to both the spindle driver circuit and the actuator driver circuit. High performance files require a high spindle velocity which necessitates a high spindle current level. High performance files also feature fast seeking performance which requires high peak actuator current levels during acceleration and deceleration. The peak actuator current drawn during the deceleration sequence of the seek is significantly more than the peak current drawn during the acceleration sequence due to voltage adding effects of a back electromotive force (back EMF) induced in the actuator. During the deceleration sequence, back EMF effectively adds to the supply voltage so that more actuator current can be drawn from the power supply. Conversely, during the accelerate portion of the seek, the back EMF subtracts from the supply voltage, thereby causing the current to become lower as the actuator moves faster. In modem servo controller designs, velocity versus position schedulers of the servo controller are designed assuming that the acceleration and deceleration will change with the velocity of the actuator.

Although the back EMF provides the ability to decelerate faster and thus improve seek times, the peak actuator current drawn during deceleration is increased. An excessive peak actuator current drawn during deceleration presents problems because the peak power output of the disk drive power supply, which concurrently provides power to the spindle driver, may be exceeded when the peak deceleration current is reached. For a disk drive including multiple platters and having data stored according to a striping technique, the peak current drawn during deceleration is particularly problematic because each of a plurality of actuators may seek, and decelerate, at the same time thereby drawing peak currents simultaneously.

Because seek performance is limited by the amount of current available for acceleration and deceleration, there is an inherent design tradeoff between seeking performance and peak actuator current. One way to ensure that the peak power output of the power supply is not exceeded during deceleration is to design the deceleration profile with adequate margin for peak current taking into account the maximum output of the power supply, back EMF effects of the actuator, and other appropriate design parameters. Increasing the coil resistance of the actuator provides reduction of the peak actuator current values, but this is accomplished at the cost of decreased seeking performance. Therefore, as the seek performance and spindle speeds required by higher performance files increase, it becomes necessary for disk drives to be equipped with larger power supplies which is very costly.

Dunn (U.S. Pat. No. 5,381,279) discloses a method of reducing peak power requirements of a power supply of a disk drive wherein the spindle current is reduced during the acceleration sequence of the seek operation, and then compensated for during a coast sequence of the seek operation so that the spindle velocity is maintained at the required rate. However, this method does not provide a solution to the above described problem of high peak actuator current drawn during the deceleration sequence due to back EMF effects. Also, not all seek operations include a coasting sequence during which to compensate for spindle current is reduced during actuator acceleration.

What is needed is a method and apparatus for limiting the total amount of power drawn from the power supply of a disk drive during the deceleration sequence of a seeking operation wherein seeking performance is not sacrificed.

SUMMARY OF THE INVENTION

It is an object of the present invention to provide an apparatus and method for limiting the amount of power drawn from the power supply of a disk drive during the deceleration sequence of a seeking operation wherein seeking performance is not sacrificed.

Briefly, a presently preferred embodiment of the present invention includes a disk drive system including: a disk having position information stored in a plurality of tracks formed on the disk; a spindle motor for rotating the disk in response to a spindle current generated by a spindle driver circuit which is responsive to a spindle command signal, the spindle motor rotating the disk at a nominal speed while the spindle current has a nominal value; an arm assembly for positioning a head relative to the tracks of the disk, the head being operative to read the position information in order to generate a position signal; an actuator for driving the arm assembly in response to an actuator current generated by an actuator driver circuit which is responsive to an actuator command signal; a supply providing power to the spindle driver circuit and to the actuator driver circuit; and a servo controller.

The servo controller is responsive to the position signal and operative to determine values for servo parameters during each of a plurality of sampling intervals, and is also operative to update the spindle command signal and the actuator command signal during the sampling intervals for controlling seeking operations including an acceleration sequence and a deceleration sequence for positioning the head at a target track. The controller is further operative to implement a process of limiting the current drawn from the supply during periods of the deceleration sequence.

In the process of the present invention, the spindle command signal is regulated to adjust the spindle current to a reduced value which is less than the nominal value during a spindle energy deferring period while the actuator current exceeds a predetermined threshold value. During each of the sampling intervals transpiring during the spindle energy deferring period: a deferred spindle current value, which is proportional to the difference between the nominal value and the reduced value, is determined; and the deferred spindle current value is added to an accumulation of prior deferred spindle current values to develop a quantity of deferred spindle energy. The spindle command signal is subsequently regulated to adjust the spindle current to an increased value which is greater than the nominal value during a spindle energy compensating period to develop a quantity of compensating spindle energy which is approximately equal to the quantity of deferred spindle energy, thereby ensuring that the spindle velocity is set to a value approximately equal to the nominal value at the end of the deceleration sequence. In this manner, the aggregate of actuator current and spindle current drawn from the supply during the deceleration sequence of a seeking operation is limited without compromising the spindle speed.

An important advantage of the present invention is that the amount of power drawn from the power supply of the disk drive during the deceleration sequence of a seeking operation may be limited without sacrificing seeking performance. Therefore, the need for a more costly power supply may be avoided in a disk drive system according to the present invention.

Another important advantage of a disk drive implementing the process of the present invention is that the maximum allowable peak actuator current is increased as compared with the maximum peak actuator current allowed in a conventional disk drive system using the same type of power supply.

The foregoing and other objects, features, and advantages of the invention will be apparent from the following detailed description of the preferred embodiment which makes reference to the several figures of the drawing.

IN THE DRAWINGS

DETAILED DESCRIPTION OF THE PREFERRED EMBODIMENTS

Figure 1:
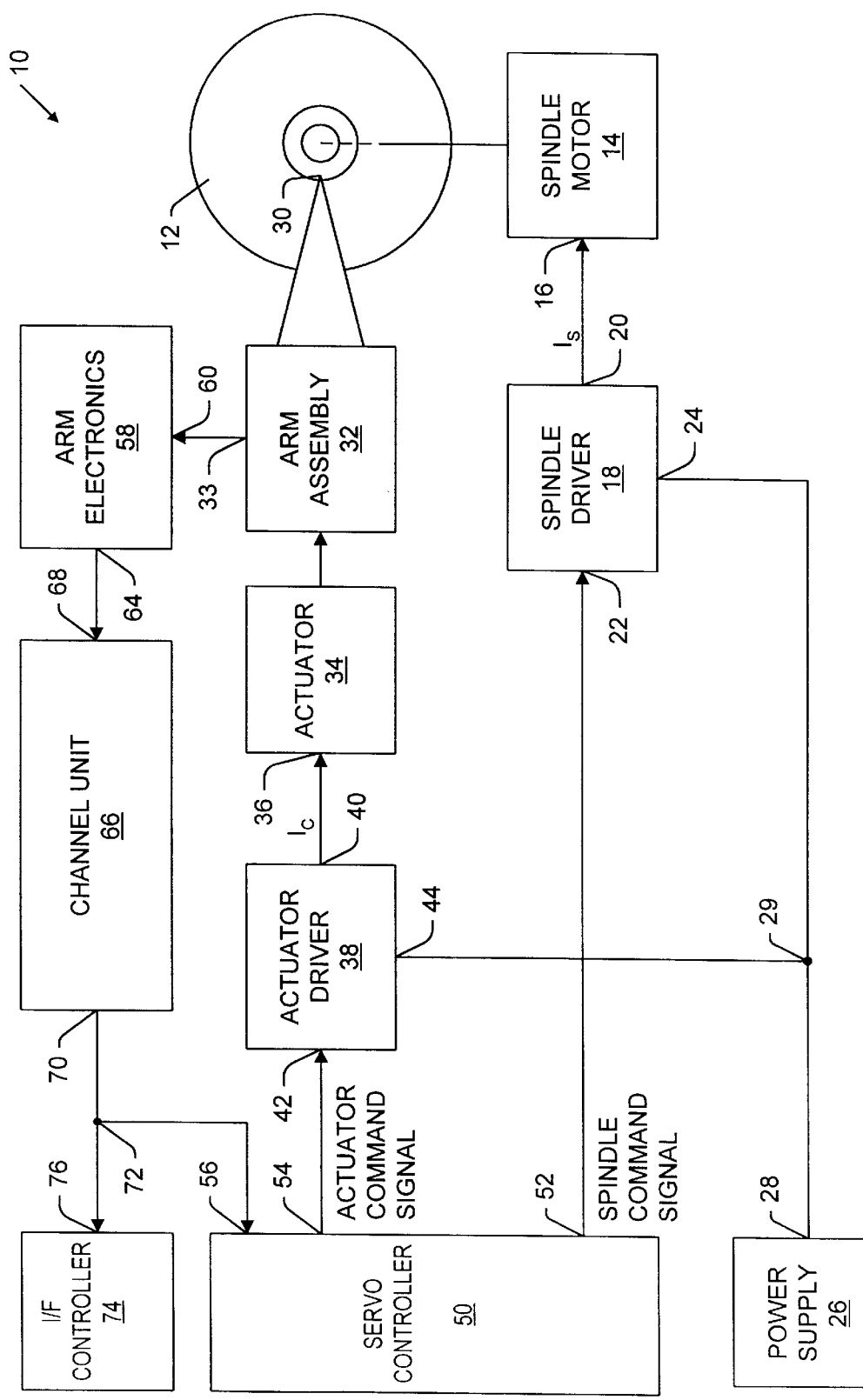
FIG. 1 is a schematic block diagram of a disk drive system which may be used to implement the present invention, the system including a power supply, an actuator driver circuit drawing power from the supply, and a spindle driver circuit drawing power from the supply.

FIG. 1 shows a block diagram at 10 of a disk drive suitable for practicing the present invention. The disk drive 10 includes: a disk 12 having a thin magnetic coating formed thereon for storing user data and position information on a plurality of concentric tracks, the disk being rotatably mounted to a spindle motor 14 having an input 16 coupled to receive a spindle current $I_S$ which drives the spindle motor; a spindle driver circuit 18 having an output 20 providing the spindle current signal $I_S$ to the spindle motor, an input 22 coupled to receive a spindle command signal for controlling the spindle current $I_S$ in order to control the rotational velocity of the spindle motor, and an input 24 coupled to receive a power signal; and a power supply 26 having an output 28 providing the power signal to input 24 of the spindle driver unit 18 via a node 29. The disk drive 10 also includes: one or more transducers or read heads 30 for reading magnetic transitions on the disk 12; an arm assembly 32 for supporting the read heads 30 in close proximity to the rotating disk surface, and having an output 33 providing a servo signal carrying user data and position information provided as the head reads the disk; an actuator 34 for driving the arm assembly in response to an actuator current signal, or coil current signal, $I_C$ received at an input 36; and an actuator driver 38 having an output 40 providing the actuator current $I_C$ to the actuator motor, an input 42 connected to receive an actuator command signal for controlling the actuator current $I_C$ in order to control the position of the read/write head 30 via the actuator and arm assembly, and an input 44 coupled to receive the power signal from output 28 of the power supply 26 via node 29. The arm assembly 32 may be a linear or rotary type assembly. The actuator 34 preferably comprises a voice coil motor responsive to the actuator current $I_C$ provided by the actuator driver circuit 38.

The disk drive 10 further includes: a servo controller 50 including an output 52 coupled to provide the spindle command signal to input 22 of the spindle driver circuit 18, an output 54 coupled to provide the actuator command signal to input 42 of the actuator driver circuit 38, and an input 56; an arm electronics circuit 58 having an input 60 coupled to receive the servo signal carrying user data and position information from the head 30 via output 33 of the arm assembly, and an output 64 providing a pre-amplified servo signal; a channel unit 66 having an input 68 connected to receive the pre-amplified servo signal from output 64 of the arm electronics unit, and an output 70 connected to provide a position signal carrying position information to input 56 of the servo controller 50 via a node 72; and an interface controller 74 having a port 76 connected to output 70 of the data channel unit 66.

The channel unit 66 is preferably of the PRML type and includes an automatic gain control circuit, a variable frequency oscillator circuit, and sync-byte detection circuitry. Descriptions of PRML channels are provided in commonly assigned U.S. Pat. Nos. 5,220,466 and 5,255,131.

In the preferred embodiment, the servo controller 50 is a digital controller which implements discrete sampling of the position signal to determine position and velocity parameters. Also, in varying embodiments, the controller includes either a microprocessor or a digital signal processor and may also include support logic such as counters, an interrupt controller, a direct memory access controller, a serial interface controller, and other components generally known to assist microprocessor control functions. The controller is normally associated with a predetermined amount of read only type memory for storing a control program, RAM, and a reference clock. The controller directly oversees operation of the interface control logic, the data channel, and actuator and spindle control circuitry.

The controller 50 controls the precise positioning of the head 30 during execution of track seek and track following operations by regulating the voltage of the actuator command signal provided to the input 42 of the actuator driver circuit 38. The controller 50 implements closed loop servo control which utilizes feedback position information from the disk to find and maintain a position over a target track of the disk. The position information may be located on a single dedicated disk surface (i.e., a dedicated servo) or embedded on data tracks between portions of user data (embedded servo). The actuator control electronics may be combined with a spindle motor control (TNS 320) and any other necessary support logic and micro code.

Figure 2:
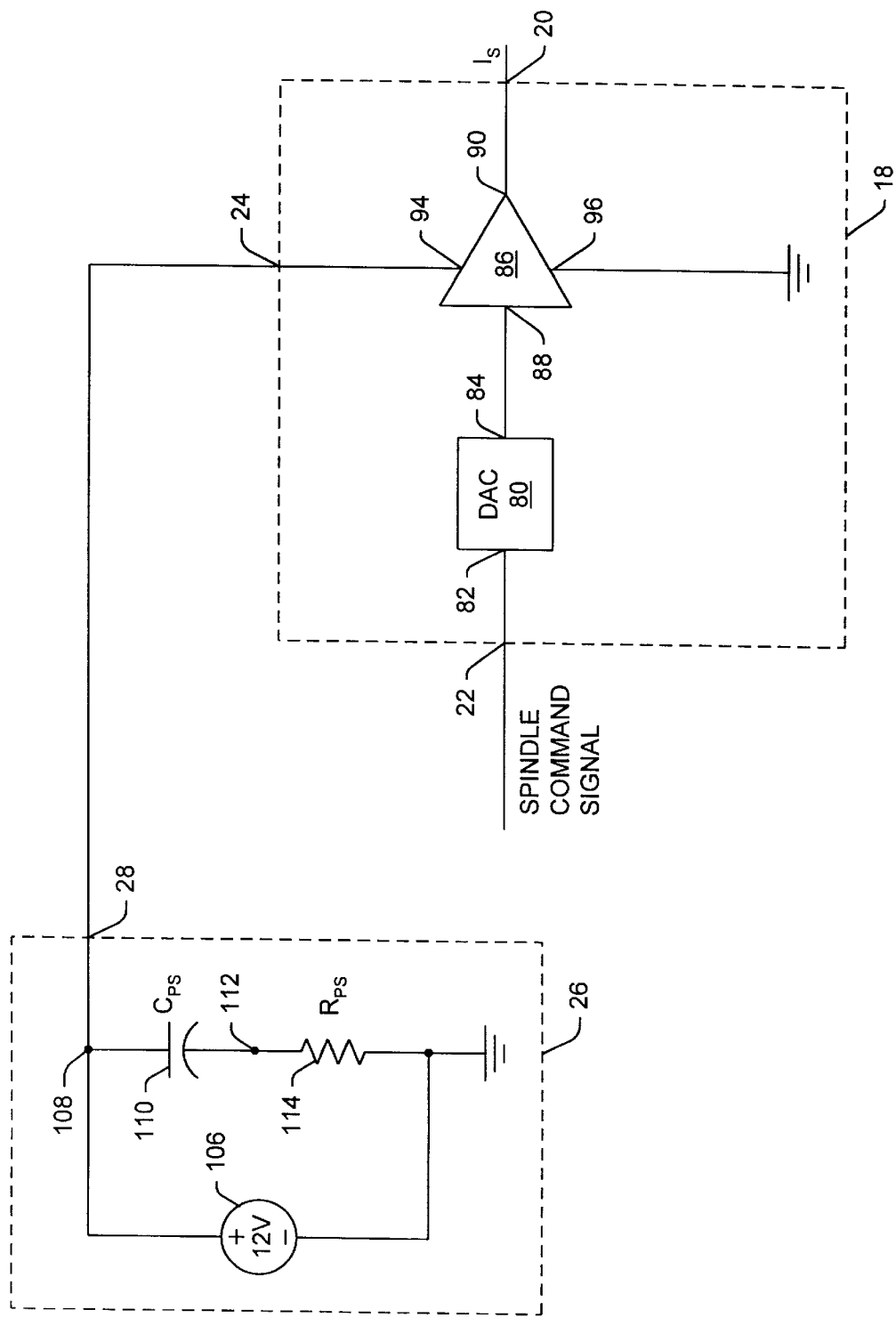
FIG. 2 is a detailed schematic circuit diagram of the power supply connected to the spindle driver circuit of FIG. 1.

FIG. 2 shows a detailed schematic circuit diagram of the spindle driver circuit 18 coupled to the power supply 26 of FIG. 1. Spindle driver circuit 18 includes: a digital to analog converter (DAC) 80 including an input 82 connected to receive the spindle command signal from output 52 of servo controller 50 (FIG. 1) via input 22 of the driver circuit 18, and an output 84; and a transconductance amplifier 86 having an input 88 connected to output 84 of the DAC 80, an output 90 connected to a node 92 which is connected to the output 20 of the spindle driver circuit, a first power terminal 94 connected to receive the power signal from the power supply 26 via input 24 of the circuit 18, and a second power terminal 96 connected to ground. Because the transconductance amplifier 86 has functional characteristics of a low band width filter, the spindle current signal $I_S$ lags behind the voltage of the spindle command signal. In an embodiment, the transconductance amplifier has a bandwidth approximately equal to 300 Hz. Therefore, a time delay is incurred as the spindle current $I_S$ responds to changes in the voltage level of the spindle command signal.

Seeking operations performed by the servo controller 50 (FIG. 1) include an acceleration sequence and a deceleration sequence. During the acceleration sequence of the seek operation, the actuator current $I_C$ rises and falls in accordance with a standard acceleration current profile for performing the acceleration sequence. Although not required, a seek operation according to the present invention may include a coast sequence of operation. In a preferred embodiment of the present invention, the acceleration sequence is implemented in a voltage mode wherein a voltage approximately equal to the full voltage available at the power supply 26 (FIG. 1) is provided to the actuator driver circuit 38. Also, in the preferred embodiment, the deceleration sequence is implemented in a current mode wherein the controller 50 (FIG. 1) controls the actuator command signal to be proportional to the difference between a target velocity and an estimated velocity for each sampling interval.

Figure 3:
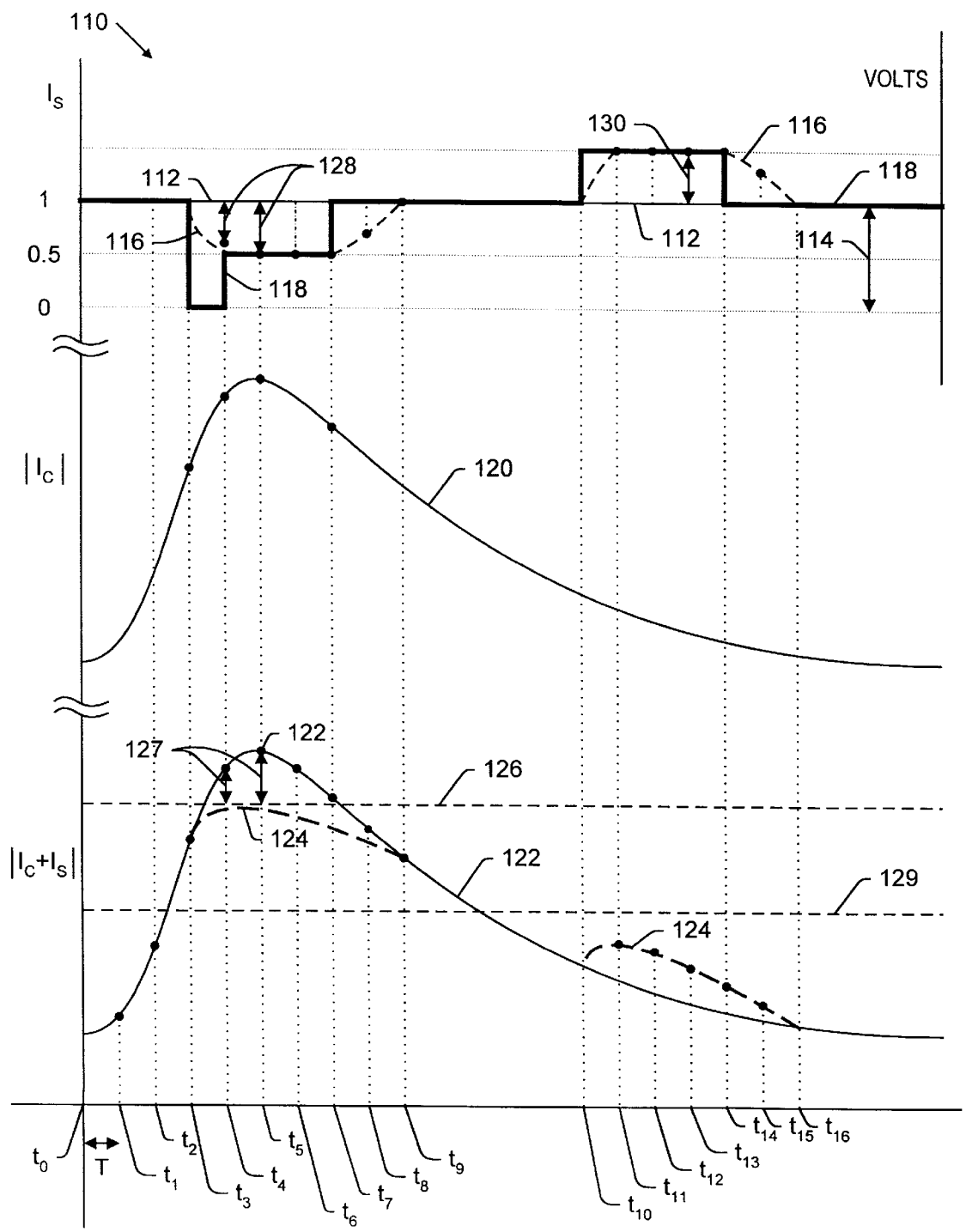
FIG. 3 is a graph illustrating wave forms representing current parameters of the disk drive FIG. 1 as functions of time as controlled according to a current limiting process of the present invention.

FIG. 3 shows a graph at 110 illustrating wave forms representing current parameters of the disk drive system 10 (FIG. 1) as a function of time, the current parameters being controlled by the servo controller 50 (FIG. 1) according to a current limiting process of the present invention performed during the deceleration sequence of a seek operation. The depicted wave forms include: a nominal spindle current wave form 112 (solid line) representative of a nominal spindle current $I_S$ provided at output 20 of the spindle driver circuit 18 (FIG. 1), the nominal spindle current $I_S$ having a nominal spindle current level 114 which is approximately equal to 1 Amp in the depicted example; an adjusted spindle current wave form 116 (dashed line) representative of the spindle current $I_S$ provided by the spindle driver circuit 18 (FIG. 1) as controlled by the spindle current command signal according to the current limiting process of the present invention; a spindle command signal wave form 118 representative of the spindle command signal provided at output 52 of the servo controller 50 (FIG. 1) according to the current limiting process of the present invention; an actuator current wave form 120 representative of the absolute value of the actuator current $I_C$ as calculated in accordance with a standard actuator current profile for the deceleration sequence; a standard aggregate wave form 122 (solid line) representative of the sum of the nominal spindle current wave form 112 and the actuator current wave form 120; and an adjusted aggregate wave form 124 (dashed line) representative of the sum of the adjusted spindle current wave form 116 and the actuator current wave form 120 in accordance with the current limiting process of the present invention.

The servo controller 50 (FIG. 1) updates the spindle command signal (wave form 118) once per spindle sampling interval (or spindle update period), $T_S$. The servo controller 50 (FIG. 1) updates the actuator command signal (not shown) once per actuator sampling interval, $T_C$. In a typical disk drive, the spindle command signal is updated 100 times per second and the actuator command signal is updated 10,000 times per second. Therefore, the spindle sampling interval $T_S$ is usually much greater than the actuator sampling interval, $T_C$. However, in the process of the present invention, the spindle command signal is sampled and updated once per actuator sampling interval, $T_C=T$.

At a time $t_0$, the servo controller 50 (FIG. 1) updates the spindle command signal (wave form 118) and the actuator command signal (not shown). At a time $t_1$, T seconds after time $t_0$, the servo controller updates the spindle command signal and actuator command signal again. At time $t_0$, at the beginning of a deceleration sequence of a track seeking operation, the servo controller begins executing the current limiting process of the present invention for limiting the amount of power drawn from the power supply 26 (FIG. 1) during periods of the deceleration sequence. At the beginning of each sampling interval, the servo controller: (1) determines a present value for the actuator command signal (not shown) and a present value for the corresponding actuator current $I_C$ (wave form 120) for the present sampling interval; (2) predicts the value of the actuator command signal for the Nth subsequent sampling interval and a value of the actuator current $I_C$ (wave form 120) for the Nth subsequent sampling interval, wherein N is an integer number; and (3) adds the predicted actuator current values (wave form 120) for the Nth subsequent sampling interval to the nominal spindle current value 114 to determine a predicted value for the standard aggregate current (wave form 122) for the Nth subsequent sampling interval.

During sampling intervals while the actuator current signal (wave form 120) is increasing, the servo controller determines whether predicted values of the standard aggregate current value (wave form 122) for the Nth subsequent sampling interval is greater than a first threshold value 126. If it is determined that a predicted value of the standard aggregate current (wave form 122) is greater than the first threshold value 126, the servo controller begins reducing the value of the adjusted spindle current $I_S$ (wave form 116) by controlling the spindle command signal (wave form 118) appropriately so that the sum of the actuator current (wave form 120) and the adjusted spindle current (wave form 116), which yields the adjusted aggregate value (wave form 124), does not exceed the first threshold 126 for the Nth subsequent sampling interval.

For example, if N=1, at time $t_2$, the servo controller predicts a value of the actuator command signal (not shown) and a corresponding value of the actuator current signal (wave form 120) for the next sampling interval beginning at time $t_3$. At time $t_2$, the servo controller determines that the predicted standard aggregate current value (wave form 122) for the next sampling interval, beginning at time $t_3$, is not greater than the first threshold value 126.

At time $t_4$, the servo controller determines that the deferred spindle current value 128 is at approximately the right level to avoid excessive peak current. Therefore, at time $t_4$, the servo controller steps the current command signal (wave from 118) up from the voltage corresponding to the zero Amp spindle current value to a voltage corresponding to a 0.5 Amp spindle current value which, in the depicted example, is equal to the nominal value 114 minus the corresponding aggregate excess current value 127 minus a constant value. At time $t_5$, the standard aggregate current value (wave form 122) reaches its peak value. The delay time between time $t_3$, at which the adjusted spindle current (wave form 116) begins decreasing, and time $t_5$, at which the adjusted spindle current reaches the target reduced value, is due to the low bandwidth characteristics of the transconductance amplifier 86 (FIG. 2) as discussed above.

At time $t_3$, to compensate for the delay in order to achieve a faster spindle current response, the servo controller steps the current command signal (wave form 118) down from the voltage corresponding to the one Amp spindle current to a voltage corresponding to a zero Amp spindle current value which is substantially less than the voltage corresponding to the target reduced value of the adjusted spindle current. As the servo controller begins reducing the value of the adjusted spindle current $I_S$ (wave form 116) by controlling the spindle command signal (wave form 118) at time $t_3$, the servo controller determines a deferred spindle current value 128 for the present sampling interval by subtracting the present value of the adjusted spindle current value (wave form 116) from the nominal spindle current value (wave form 118).

At time $t_4$, the servo controller determines that the deferred spindle current value 128 is at approximately the right level to avoid excessive peak current. Therefore, at time $t_4$, the servo controller steps the current command signal (wave form 118) up from the voltage corresponding to the zero Amp spindle current value to a voltage corresponding to a 0.5 Amp spindle current value which, in the depicted example, is equal to the nominal value 114 minus the corresponding aggregate excess current value 127 minus a constant value. At time $t_5$, the standard aggregate current value (wave form 122) reaches its peak value. The delay time between time $t_3$, at which the adjusted spindle current (wave form 116) begins decreasing, and time $t_5$, at which the adjusted spindle current reaches the nominal spindle current value 114, is due to the low bandwidth characteristics of the transconductance amplifier 86 (FIG. 2) as discussed above.

After the servo controller begins reducing the value of the adjusted spindle current $I_S$ (wave form 116) by controlling the spindle command signal (wave form 118), the servo controller: adds the deferred spindle current value 128 for the present sampling interval to a total deferred spindle current value stored in a register of the servo controller 50 (FIG. 1) to develop a quantity of deferred spindle energy; and determines whether the predicted value of the standard aggregate current (wave form 122) for the Nth subsequent sampling interval is less than the first threshold value 126. If the predicted value of the standard aggregate current (wave form 122) for an Nth subsequent sampling interval is less than the first threshold value 126, the servo controller begins increasing the current command signal (wave form 118) in order to increase the adjusted spindle current $I_S$ (wave form 116) back towards the nominal spindle current level 114.

In the depicted example, at times $t_4$, $t_5$, $t_6$, and $t_7$, the servo controller determines whether the predicted value of the standard aggregate current value (wave form 122) for the next sampling interval is less than the first threshold value 126. At time $t_7$, the servo controller determines that the predicted value of the standard aggregate current value (wave form 122) for the next sampling interval, beginning at time $t_8$, is less than the first threshold value 126. Therefore, at time $t_7$, the servo controller steps the current command signal (wave form 118) up from the voltage corresponding to the 0.5 Amp spindle current back to the voltage corresponding to the one Amp spindle current value in order to begin increasing the adjusted spindle current (wave form 116) back toward the nominal spindle current value 114. At time $t_9$, the adjusted spindle current (wave form 116) reaches the nominal spindle current value 114, the delay being due to the low bandwidth properties of the transconductance amplifier 86 (FIG. 2) as described above.

As a result of reducing the spindle current during a spindle energy deferring period between times $t_3$ and $t_9$, the energy provided to the spindle motor is reduced and the spindle velocity of the spindle motor 14 (FIG. 1) is decreased. Therefore, it is necessary to increase the spindle current in order to ensure that the spindle velocity returns to its nominal value before a problem with spindle speed is incurred. The spindle speed of a disk drive must be controlled very accurately, typically within 0.1% of a target speed. If the speed deviates by more than this, then customer data can not be accurately recorded or reproduced. This is because the recording frequency depends on the spindle speed. For example, data reproduced when the spindle speed is lower than the spindle speed when it was written will appear to have a lower frequency than it should.

Therefore, at a time, $t_{10}$, after the standard aggregate current (wave form 122) decreases below a second threshold value 129, which is less than the first threshold value 126, and before the end of the deceleration sequence of the seeking operation, the servo controller 50 (FIG. 1) begins implementing a spindle current compensating sequence of the current limiting process of the present invention. At time $t_{10}$, the servo controller increases the spindle command signal (wave form 118) to begin increasing the adjusted spindle current (wave form 116) in order to compensate for the current deferred during the time period between times $t_3$ and $t_9$. During each sampling interval following time $t_{10}$, the servo controller: (1) determines a spindle current compensation value 130 for the present sampling interval by subtracting the nominal current value 114 from the present value of the adjusted spindle current (wave form 116); (2) adds the spindle current compensation value 130 for the present sampling interval to a total compensating spindle current value to develop a quantity of compensating spindle energy; and (3) determines whether or not the quantity of compensating spindle energy is greater than or equal to the quantity of deferred spindle energy.

In general, the integral of the spindle current $I_S$, less the drag forces on the disk, is proportional to the spindle velocity. Therefore, if the quantity of compensating spindle energy is equal to the quantity of deferred spindle energy, then the spindle velocity, which is decreased during the current deferring sequence, will be returned to the nominal spindle velocity during the compensating sequence of the current limiting process of the present invention.

At time $t_{14}$, the servo controller determines that the quantity of compensating spindle energy is approaching the quantity of deferred spindle energy. Therefore, at time $t_{14}$, the servo controller decreases the spindle command signal (wave form 118) to begin decreasing the adjusted spindle current (wave form 116). At time $t_{16}$, the adjusted spindle current (wave form 116) reaches the nominal spindle current value. In an embodiment of the present invention, a predictive analysis is used to more accurately control the spindle current compensating sequence so that the total amount of compensating spindle current, or compensating spindle energy, is more accurately set to the total amount of deferred spindle current, or deferred spindle energy.

As a result of increasing the spindle current during a spindle energy compensating period between times $t_{10}$ and $t_{16}$, the energy provided to the spindle motor is increased and the spindle velocity of the spindle motor 14 (FIG. 1) is increased. Note that the predictive analysis used in the spindle current deferring sequence, as described above, may be easily applied to the spindle current compensating sequence if increased accuracy is required in the servo system.

Figure 4:
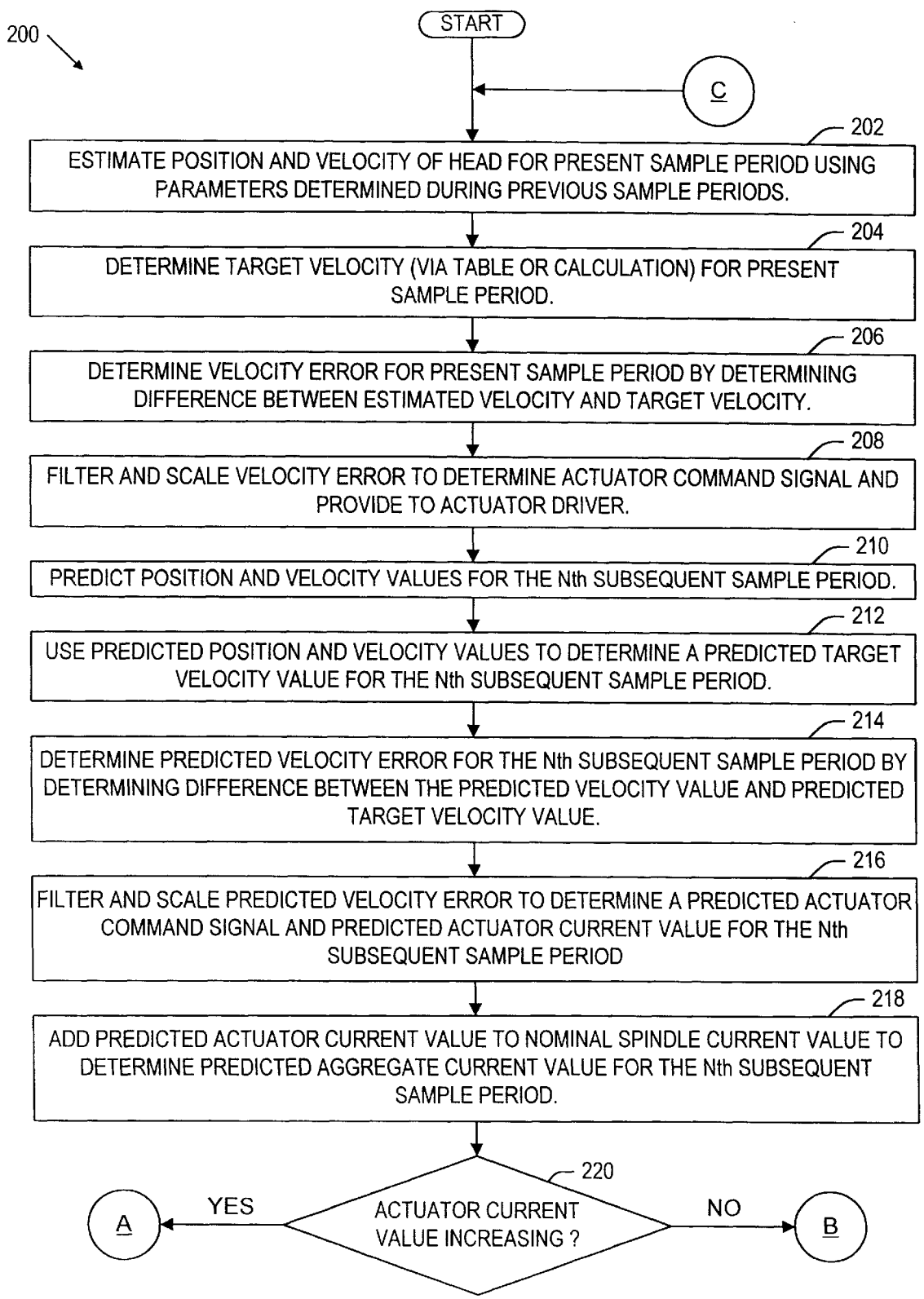
FIG. 4 is a flow diagram illustrating a spindle current deferring sequence of the current limiting process of the present invention.

FIG. 4 shows a flow diagram at 200 illustrating a spindle current deferring sequence of the current limiting process of the present invention. In the preferred embodiment of the present invention, the current limiting process is implemented as microcode executed over a processor of the servo controller 50 (FIG. 1). The depicted process begins with step 202 in which the servo controller 50 (FIG. 1) estimates the position and velocity of the head 30 (FIG. 1) for a present actuator sampling interval using parameters determined during previous sampling intervals. In step 204, the servo controller determines a target velocity for the present sampling interval using either a table or a calculation method. In step 206, the servo controller determines a velocity error for the present sampling interval by determining the difference between the estimated velocity determined in step 202 and the target velocity determined in step 204. In step 208, the servo controller filters and scales the velocity error determined in step 206 to determine a value of the actuator command signal which is then provided to the actuator driver circuit 38 (FIG. 1) for controlling the actuator current. In step 210, the servo controller predicts values of the actuator position and velocity parameters for the Nth subsequent sampling interval. In varying embodiments of the present invention, N is an integer number in the range between 1 and 5.

In step 212, the servo controller uses the predicted values of the position and velocity parameters to determine a predicted target velocity value for the Nth subsequent sampling interval. In step 214, the servo controller determines a predicted velocity error for the Nth subsequent sampling interval by determining the difference between the predicted velocity value determined in step 210 and the predicted target velocity value determined in step 212. In step 216, the servo controller filters and scales the predicted velocity error determined in step 214 to determine a predicted value for the actuator command signal, and a corresponding predicted value of the actuator current $I_C$ (wave form 120 of FIG. 3), for the Nth subsequent sampling interval. In step 218, the servo controller adds the predicted value of the actuator current to the nominal spindle current value 114 (FIG. 3) to determine the predicted aggregate current value (wave form 122 of FIG. 3) for the Nth subsequent sampling interval. From step 218, the depicted process proceeds to determine at 220 whether the actuator current $I_C$ (wave form 120 of FIG. 3) is presently increasing. If it is determined at 220 that the actuator current $I_C$ is presently increasing, the depicted process proceeds directly to "A" (to FIG. 5). If it is determined at 220 that the actuator current $I_C$ is not presently increasing, the depicted process proceeds directly to "B" (to FIG. 6).

Figure 5:
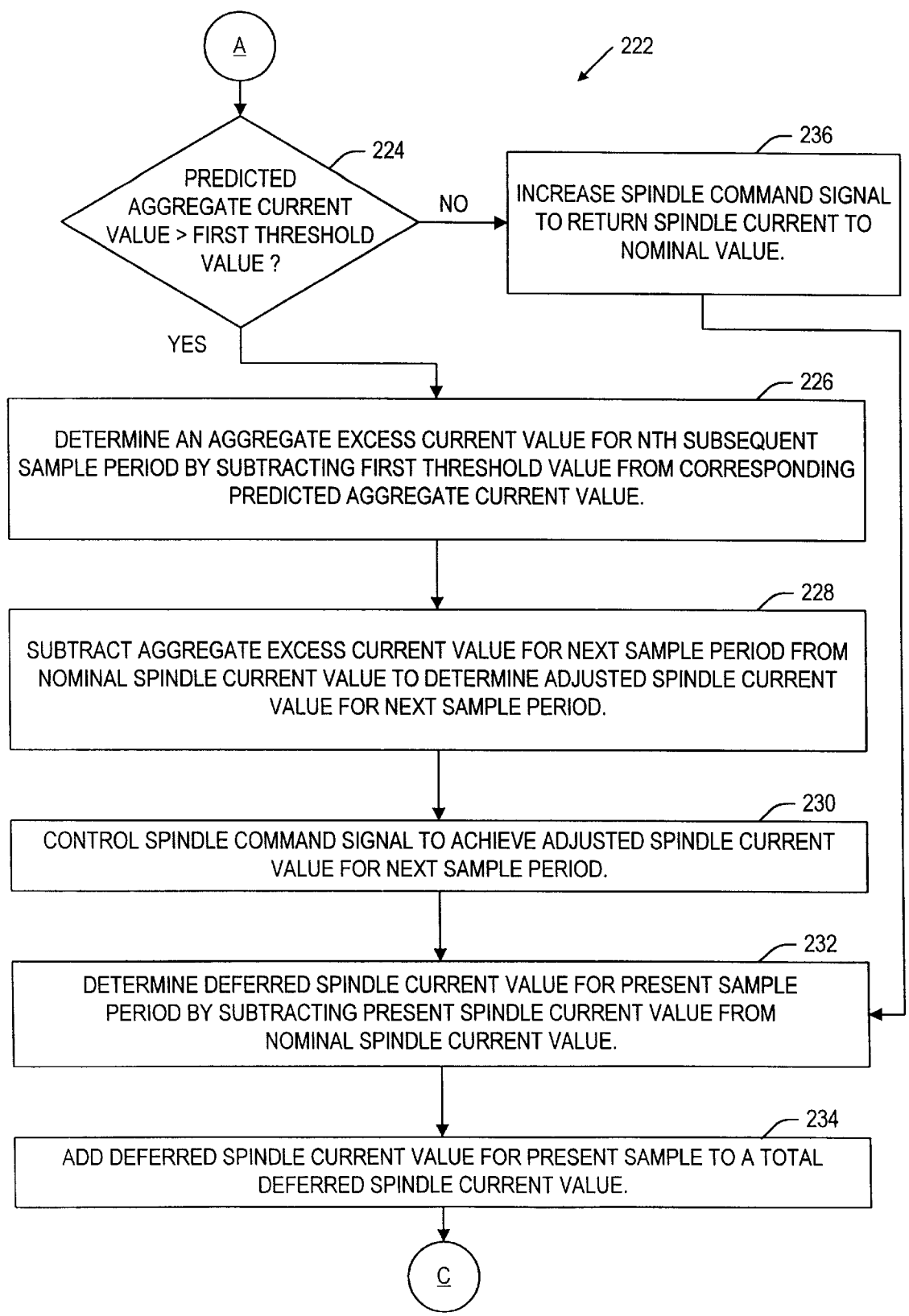
FIG. 5 is a flow diagram illustrating additional steps of the spindle current deferring sequence illustrated in FIG. 4.

FIG. 5 illustrates a sub-process at 222 for implementing additional steps of the spindle current deferring sequence according to the present invention. The depicted process steps proceed from "A" to 224 at which the servo controller determines whether the predicted value of the aggregate current (wave form 122 of FIG. 3) determined in step 218 (FIG. 4) is greater than the first threshold value 126 (FIG. 3).

If it is determined at 224 that the predicted aggregate current value is greater than the threshold value, the process proceeds to step 226 in which the servo controller determines an aggregate excess current value 127 (FIG. 3) for the Nth subsequent sampling interval by subtracting the first threshold value 126 (FIG. 3) from the predicted value of the aggregate current (wave form 122 of FIG. 3) determined in step 218. In an embodiment of the present invention, the servo controller defaults to a predetermined "worst case" aggregate excess current value 127 (FIG. 3) for the Nth subsequent sampling interval. The worst case aggregate excess current value can be determined for a particular disk drive system based on the seeking performance specifications of the system.

In step 228, the servo controller subtracts the aggregate excess current value 127 (FIG. 3) for the next sampling interval from the nominal spindle current value 114 (FIG. 3) to determine a target value for the adjusted spindle current (wave form 116 of FIG. 3) for the next sampling interval. In step 230, the servo controller controls the spindle command signal 118 (FIG. 3) to achieve the adjusted spindle current value for the next sampling interval. In step 232, the servo controller determines deferred spindle current value 128 (FIG. 3) for the present sampling interval by subtracting the present value of the adjusted spindle current (wave form 116 of FIG. 3) from the nominal spindle current value 114 (FIG. 3). In step 234, the servo controller adds the deferred spindle current value 128 for the present sampling interval to a total deferred spindle current value maintained in a register of the servo controller 50 (FIG. 1) in order to develop a quantity of deferred spindle energy. After executing step 234, the depicted process proceeds directly to "C" (back to step 202 of FIG. 4).

If it is determined at 224 that the predicted aggregate current value is not greater than the threshold value, the process proceeds directly to step 236 in which the servo controller increases the spindle command signal 118 (FIG. 3) to return the spindle current to its nominal value. From step 236, the depicted process proceeds to execute steps 232 and 234 as described above in order to update the total deferred spindle current value and the quantity of deferred spindle energy. After executing step 234, the process proceeds directly to "C" (back to step 202 of FIG. 4).

Figure 6:
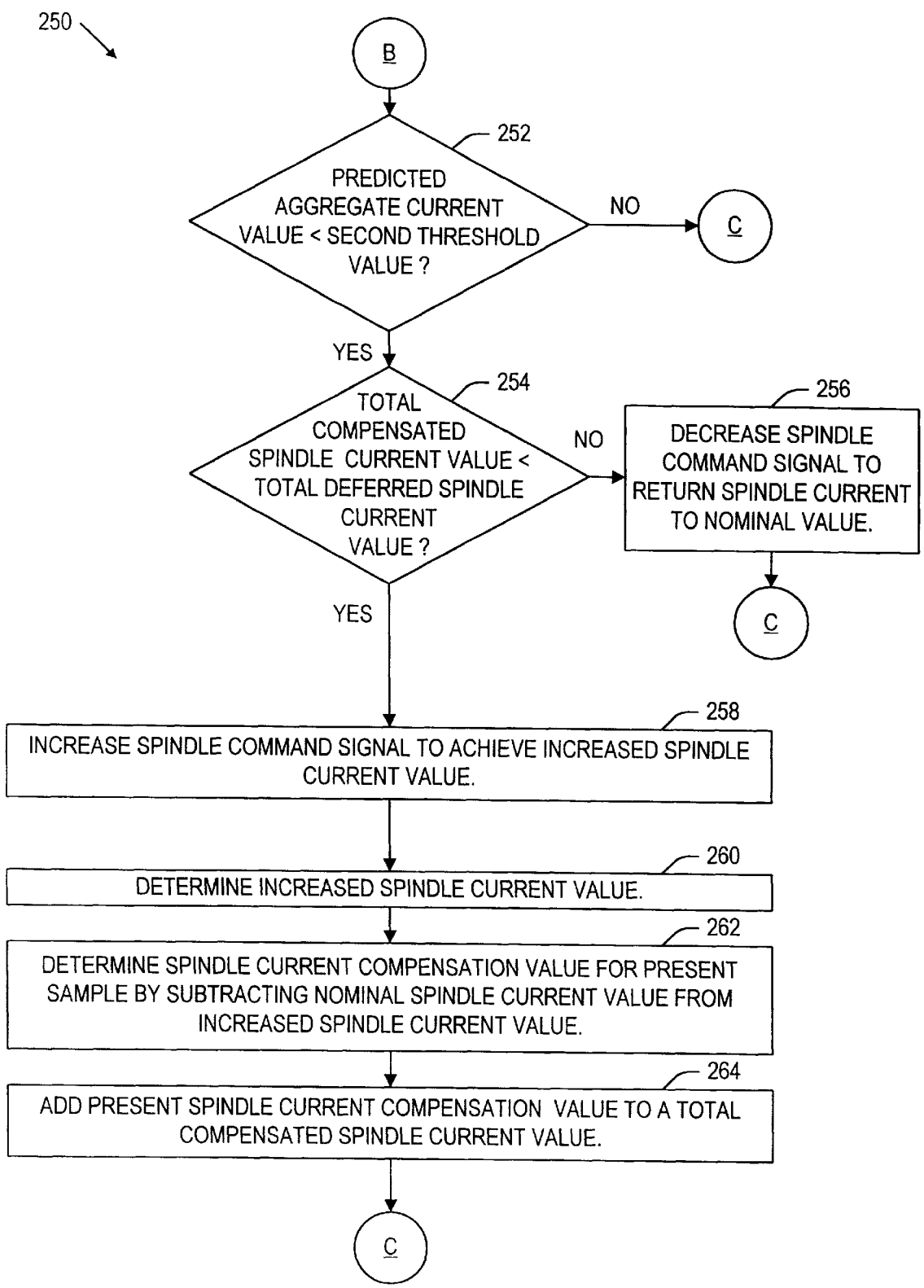
FIG. 6 is a flow diagram illustrating a spindle current compensating sequence of the current limiting process of the present invention.

FIG. 6 shows a flow chart at 250 illustrating a spindle current compensating sequence of the current limiting process of the present invention. The process proceeds from "B" (FIG. 4) to 252 at which the servo controller determines whether the predicted value of the aggregate current (wave form 122 of FIG. 3) determined in step 218 (FIG. 4) is less than the second threshold value 129 (FIG. 3). If it is determined at 252 that the predicted value of the aggregate current is not less than the second threshold value, the depicted process proceeds directly to "C" (back to step 202 of FIG. 4).

If it is determined at 252 that the predicted value of the aggregate current is less than the second threshold value, the process proceeds to 254 at which is then determined whether or not a quantity of compensating spindle energy is less than the quantity of deferred spindle energy determined in step 234 (FIG. 5). If it is determined at 254 that the quantity of compensating spindle current is not less than the quantity of deferred spindle current, the depicted process proceeds to step 256 in which the servo controller decreases the spindle command signal (wave form 118 of FIG. 3) to begin changing the adjusted spindle current (wave form 116 of FIG. 3) back to the nominal value 114 (FIG. 3).

If it is determined at 254 that the quantity of compensating spindle current is not less than the quantity of deferred spindle current, the depicted process proceeds to step 258 in which the servo controller increases the spindle command signal to achieve a desired value of the adjusted spindle current (wave form 116 of FIG. 3). In step 260, the servo controller determines the present value of the adjusted spindle current (wave form 116 of FIG. 3) such as by executing steps 202, 204, 206, and 208 of the process 200 (FIG. 4).

In step 262, the servo controller determines the spindle current compensation value 130 (FIG. 3) for the present sampling interval by subtracting the nominal spindle current value 114 (FIG. 3) from the present value of the adjusted spindle current (wave form 116) determined in step 260. In step 264, the servo controller adds the present spindle current compensation value 130 (FIG. 3) to a total compensating spindle current value stored in a register of the servo controller 50 (FIG. 1) in order to develop a quantity of compensating spindle energy.

Note that the predictive analysis of the spindle current deferring sequence (FIG. 4) can be used in the compensating sequence of the current limiting process at 250 (FIG. 6) so that the total amount of compensating spindle current, and thus the quantity of compensating spindle energy, can be controlled more accurately. However, the error in spindle velocity due to the difference between the total amount of deferred spindle current, or deferred spindle energy, versus the total amount of compensating spindle current, or compensating spindle energy, may be sufficiently minimized without predictive analysis when implemented in modern servo systems.

Although the present invention has been particularly shown and described above with reference to a specific embodiment, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. A machine readable storage device having stored therein encoding instructions for executing a process for limiting energy consumption in a disk drive system including a disk having a plurality of tracks formed thereon, a spindle motor for rotating the disk in response to a spindle current, the spindle motor rotating said disk at a nominal speed while the spindle current has a nominal value, an arm assembly for positioning the head relative to the tracks of the disk, an actuator for driving the arm assembly in response to an actuator current, said process being performed during periods of a deceleration sequence for positioning the head at a target track, said process comprising the steps of:

determining a reduced spindle current value which is less than said nominal value during a spindle energy deferring period;

during each of a plurality of sampling intervals transpiring during said spindle energy deferring period,
determining a deferred spindle current value which is proportional to the difference between said nominal spindle current value and said reduced spindle current value, and
adding said deferred spindle current value to an accumulation of prior deferred spindle current values to develop a measure of deferred spindle energy; and determining an increased spindle current value which is greater than said nominal spindle current value during a spindle energy compensating period, said increased spindle current value for adding a quantity of compensating spindle energy which is approximately equal to said measure of deferred spindle energy, wherein said spindle energy deferring period and said spindle energy compensating period both during the deceleration sequence.

2. A machine readable storage device as recited in claim 1 further comprising the steps of:

during each of said sampling intervals prior to said spindle energy deferring period,
determining a sample value of the actuator current,
comparing said sample value to a first threshold value, and
if said sample value is greater than said first threshold value, beginning said spindle energy deferring period by regulating said spindle current to said reduced value.

3. A machine readable storage device as recited in claim 1 further comprising the steps of:

during each of said sampling intervals prior to said spindle energy deferring period,
determining a sample value of said actuator current,
adding said sample value to said nominal value of said spindle current to determine an aggregate current value, comparing said aggregate current value to a first threshold value,
if said aggregate current value is greater than said first threshold value, beginning said spindle energy deferring period by regulating said spindle current to said reduced value.

4. A machine readable storage device as recited in claim 1 further comprising the steps of:
during each of said sampling intervals prior to said spindle energy deferring period,
determining a present value of said actuator current for the present sampling interval;
determining a predicted value of said actuator current for a subsequent sampling interval;
adding said predicted value to said nominal value of said spindle current to determine a predicted aggregate current value; and
comparing said predicted aggregate current value to a first threshold value;
if said predicted aggregate current value is greater than said first threshold value, beginning said spindle energy deferring period by regulating said spindle command signal to adjust said spindle current to said reduced value.

5. A machine readable storage device as recited in claim 1 wherein said spindle energy compensating period transpires after said spindle energy deferring period.

6. A machine readable storage device as recited in claim 1 further comprising the steps of:
during each of said sampling intervals during said spindle energy deferring period,
determining a present value of said actuator current,
subtracting a predetermined value from said present value to determine an excess current value, and
wherein said reduced value to which said spindle current is adjusted is greater than or equal to said excess current value.

7. A machine readable storage device as recited in claim 1 further comprising the steps of:
during each of said sampling intervals during said spindle energy deferring period,
determining a sample value of said actuator current,
adding said sample value to said nominal value of said spindle current to determine an aggregate current value,
subtracting a predetermined value from said aggregate current value to determine an excess current value, and
wherein said reduced value to which said spindle current is adjusted is greater than or equal to said excess current value.

8. A machine readable storage device as recited in claim 1 further comprising the steps of:
for each of said sampling intervals during said spindle energy deferring period,
determining a sample value of said actuator current,
comparing said sample value to a first threshold value, and
if said sample value is less than said first threshold value, regulating said spindle command signal to begin adjusting said spindle current from said reduced value back toward said nominal value to begin ceasing said spindle energy deferring period.

9. A machine readable storage device as recited in claim 1 further comprising the steps of:
for each of said sampling intervals during said spindle energy deferring period,
determining a sample value of said actuator current,
adding said sample value to said nominal value of said spindle current to determine an aggregate current value,
comparing said aggregate current value to a first threshold value, and
if said aggregate current value is less than said first threshold value, regulating said spindle command signal to begin adjusting said spindle current from said reduced value back toward said nominal value to begin ceasing said spindle energy deferring period.

10. A machine readable storage device as recited in claim 1 further comprising the steps of:
for each of said sampling intervals during said spindle energy deferring period,
determining a present value of said actuator current for the present sampling interval,
determining a predicted value of said actuator current for a subsequent sampling interval;
adding said predicted value to said nominal value of said spindle current to determine a predicted aggregate current value; and
comparing said predicted aggregate current value to a first threshold value;
if said predicted aggregate current value is less than said first threshold value, regulating said spindle current from said reduced value back toward said nominal value to begin ceasing said spindle energy deferring period.

11. A machine readable storage device as recited in claim 1 further comprising the steps of:
for each of a plurality of sampling intervals during said spindle energy compensating period,
determining a compensating spindle current value which is proportional to the difference between said nominal value and said increased value, and
adding said compensating spindle current value to an accumulation of prior compensating spindle current values to develop said quantity of compensating spindle energy.

12. A machine readable storage device as recited in claim 11 further comprising the steps of:
for each of a plurality of sampling intervals during said spindle energy compensating period,
comparing said quantity of compensating spindle energy to said measure of deferred spindle energy,
if said quantity of compensating spindle energy is greater than or equal to said measure of deferred spindle energy, regulating said spindle command signal to begin adjusting said spindle current from said increased value back toward said nominal value to begin ceasing said spindle energy compensating period.

13. A process for limiting energy consumption in a disk drive system including a disk having a plurality of tracks formed thereon, a spindle motor for rotating the disk in response to a spindle current, the spindle motor rotating said disk at a nominal speed while the spindle current has a nominal value, an arm assembly for positioning the head relative to the tracks of the disk, an actuator for driving the arm assembly in response to an actuator current, said process being performed during periods of a deceleration sequence for positioning the head at a target track, said process comprising the steps of:
determining a reduced spindle current value which is less than said nominal value during a spindle energy deferring period;

during each of a plurality of sampling intervals transpiring during said spindle energy deferring period,
determining a deferred spindle current value which is proportional to the difference between said nominal spindle current value and said reduced spindle current value, and
adding said deferred spindle current value to an accumulation of prior deferred spindle current values to develop a measure of deferred spindle energy; and
determining an increased spindle current value which is greater than said nominal spindle current value during a spindle energy compensating period, said increased spindle current value for adding a quantity of compensating spindle energy which is approximately equal to said measure of deferred spindle energy, wherein said spindle energy deferring period and said spindle energy compensating period both transpire during the deceleration sequence.

14. A process for limiting energy consumption as recited in claim 13 further comprising the steps of:
during each of said sampling intervals prior to said spindle energy deferring period,
determining a sample value of the actuator current,
comparing said sample value to a first threshold value, and
if said sample value is greater than said first threshold value, beginning said spindle energy deferring period by regulating said spindle current to said reduced value.

15. A process for limiting energy consumption as recited in claim 13 further comprising the steps of:
during each of said sampling intervals prior to said spindle energy deferring period,
determining a sample value of said actuator current,
adding said sample value to said nominal value of said spindle current to determine an aggregate current value,
comparing said aggregate current value to a first threshold value,
if said aggregate current value is greater than said first threshold value, beginning said spindle energy deferring period by regulating said spindle spindle current to said reduced value.

16. A process for limiting energy consumption as recited in claim 13 further comprising the steps of:
during each of said sampling intervals prior to said spindle energy deferring period,
determining a present value of said actuator current for the present sampling interval,
determining a predicted value of said actuator current for a subsequent sampling interval;
adding said predicted value to said nominal value of said spindle current to determine a predicted aggregate current value; and
comparing said predicted aggregate current value to a first threshold value;
if said predicted aggregate current value is greater than said first threshold value, beginning said spindle energy deferring period by regulating said spindle command signal to adjust said spindle current to said reduced value.

17. A process for limiting energy consumption as recited in claim 13 wherein said spindle energy compensating period transpires after said spindle energy deferring period.

18. A disk drive system comprising a disk having a plurality of tracks formed thereon, a spindle motor for rotating said disk in response to a spindle current, said spindle motor rotating said disk at a nominal speed while said spindle current has a nominal value, an arm assembly for positioning a head relative to said tracks of said disk, an actuator for driving said arm assembly in response to an actuator current, and controller means operative to regulate said spindle current and said actuator current for positioning said head at a target track, said controller means being further operative to implement a process for limiting energy consumption during periods of a deceleration sequence for positioning the head at a target track, said process comprising the steps of:
regulating said spindle current to a reduced value which is less than said nominal value during a spindle energy deferring period;
during each of a plurality of sampling intervals transpiring during said spindle energy deferring period,
determining a deferred spindle current value which is proportional to the difference between said nominal value and said reduced value, and
adding said deferred spindle current value to an accumulation of prior deferred spindle current values to develop a measure of deferred spindle energy; and
regulating said spindle current to an increased value which is greater than said nominal value during a spindle energy compensating period to add a quantity of compensating spindle energy which is approximately equal to said measure of deferred spindle energy, wherein said spindle energy deferring period and said spindle energy compensating period both transpire during the deceleration sequence.

19. A disk drive system as recited in claim 18 further comprising the steps of:
during each of said sampling intervals prior to said spindle energy deferring period,
determining a sample value of said actuator current,
comparing said sample value to a first threshold value, and
if said sample value is greater than said first threshold value, beginning said spindle energy deferring period by regulating said spindle current to said reduced value.

20. A disk drive system as recited in claim 18 further comprising the steps of:
during each of said sampling intervals prior to said spindle energy deferring period,
determining a sample value of said actuator current,
adding said sample value to said nominal value of said spindle current to determine an aggregate current value,
comparing said aggregate current value to a first threshold value,
if said aggregate current value is greater than said first threshold value, beginning said spindle energy deferring period by regulating said spindle current to said reduced value.

21. A disk drive system as recited in claim 18 further comprising the steps of:
during each of said sampling intervals prior to said spindle energy deferring period,
determining a present value of said actuator current for the present sampling interval,
determining a predicted value of said actuator current for a subsequent sampling interval;
adding said predicted value to said nominal value of said spindle current to determine a predicted aggregate current value; and comparing said predicted aggregate current value to a first threshold value;

if said predicted aggregate current value is greater than said first threshold value, beginning said spindle energy deferring period by regulating said spindle current to said reduced value.

22. A disk drive system as recited in claim 18 wherein said spindle energy compensating period transpires after said spindle energy deferring period.

23. A disk drive system as recited in claim 18 further comprising the steps of:

during each of said sampling intervals during said spindle energy deferring period, determining a present value of said actuator current, subtracting a predetermined value from said present value to determine an excess current value, and wherein said reduced value to which said spindle current is regulated is greater than or equal to said excess current value.

24. A disk drive system as recited in claim 18 further comprising the steps of:

during each of said sampling intervals during said spindle energy deferring period, determining a sample value of said actuator current, adding said sample value to said nominal value of said spindle current to determine an aggregate current value, subtracting a predetermined value from said aggregate current value to determine an excess current value, and wherein said reduced value to which said spindle current is regulated is greater than or equal to said excess current value.

25. A disk drive system as recited in claim 18 further comprising the steps of:

for each of said sampling intervals during said spindle energy deferring period, determining a sample value of said actuator current, comparing said sample value to a first threshold value, and if said sample value is less than said first threshold value, regulating said spindle current from said reduced value back toward said nominal value to begin ceasing said spindle energy deferring period.

26. A disk drive system as recited in claim 18 further comprising the steps of:

for each of said sampling intervals during said spindle energy deferring period, determining a sample value of said actuator current, adding said sample value to said nominal value of said spindle current to determine an aggregate current value, comparing said aggregate current value to a first threshold value, and if said aggregate current value is less than said first threshold value, regulating said spindle current from said reduced value back toward said nominal value to begin ceasing said spindle energy deferring period.

27. A disk drive system as recited in claim 18 further comprising the steps of:

for each of said sampling intervals during said spindle energy deferring period, determining a present value of said actuator current for the present sampling interval, determining a predicted value of said actuator current for a subsequent sampling interval;

adding said predicted value to said nominal value of said spindle current to determine a predicted aggregate current value; and comparing said predicted aggregate current value to a first threshold value;

if said predicted aggregate current value is less than said first threshold value, regulating said spindle current from said reduced value back toward said nominal value to begin ceasing said spindle energy deferring period.

28. A disk drive system as recited in claim 18 further comprising the steps of:

for each of a plurality of sampling intervals during said spindle energy compensating period, determining a compensating spindle current value which is proportional to the difference between said nominal value and said increased value, and adding said compensating spindle current value to an accumulation of prior compensating spindle current values to develop said quantity of compensating spindle energy.

29. A disk drive system as recited in claim 28 further comprising the steps of:

for each of a plurality of sampling intervals during said spindle energy compensating period, comparing said quantity of compensating spindle energy to said measure of deferred spindle energy, and if said quantity of compensating spindle energy is greater than or equal to said measure of deferred spindle energy, regulating said spindle current from said increased value back toward said nominal value to begin ceasing said spindle energy compensating period.

* * * * *